(12) United States Patent
Morton et al.

(10) Patent No.: US 10,476,384 B1
(45) Date of Patent: Nov. 12, 2019

(54) REGULATED HIGH VOLTAGE REFERENCE

(71) Applicant: Robert Bosch GmbH, Stuttgart (DE)

(72) Inventors: Danielle Morton, Santa Clara, CA (US); Chinwuba Ezekwe, Albany, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/255,253

(22) Filed: Jan. 23, 2019

Related U.S. Application Data

(60) Provisional application No. 62/691,597, filed on Jun. 28, 2018.

(51) Int. Cl.
*H02M 3/18* (2006.01)
*G05F 1/10* (2006.01)
*H02M 3/07* (2006.01)

(52) U.S. Cl.
CPC .................................. *H02M 3/073* (2013.01)

(58) Field of Classification Search
USPC .................................................. 327/534–538
See application file for complete search history.

(56) References Cited

U.S. PATENT DOCUMENTS

| | | | | |
|---|---|---|---|---|
| 6,166,527 A | * | 12/2000 | Dwelley | H02M 3/1582 323/222 |
| 6,504,349 B2 | * | 1/2003 | Jaworski | H02M 3/07 307/110 |
| 8,358,820 B2 | * | 1/2013 | Merlet | G06K 9/6277 382/128 |
| 9,385,698 B2 | * | 7/2016 | Krishnamurthy | H02M 3/157 |

* cited by examiner

*Primary Examiner* — Dinh T Le
(74) *Attorney, Agent, or Firm* — Maginot Moore & Beck LLP

(57) ABSTRACT

A variable high voltage charge-pump system includes a plurality of unregulated switching stages and a plurality of regulated switching stages arranged in a cascaded configuration. The unregulated switching stages receive unregulated voltage input signals, and the regulated switching stages receive regulated voltage input signals. An amplifier generates the regulated voltage input signals to bring the output voltage to a desired value.

16 Claims, 2 Drawing Sheets

REGULATED HIGH VOLTAGE REFERENCE

CROSS-REFERENCE TO RELATED APPLICATIONS

This application claims priority to U.S. Provisional Application Ser. No. 62/691,597 entitled "REGULATED HIGH VOLTAGE REFERENCE" by Morton et al., filed Jun. 28, 2018, the disclosure of which is hereby incorporated herein by reference in its entirety.

TECHNICAL FIELD

The disclosure is directed to voltage regulators, and, in particular, to a regulated high voltage reference.

BACKGROUND

Many electronic systems rely on the use of boosted voltages in excess of a given supply voltage. For example, micro-electromechanical systems (MEMS) may use boosted voltage to bias a proof mass to improve the sensitivity of a MEMS sensor. In some cases, a boosted voltage may be used to supply a high-voltage driver to allow for application of increased electrostatic force to actuate a MEMS device. However, generating an accurate high voltage source typically consumes a significant amount of current. When the voltage required is well above the supply voltage, charge pumps are necessary to pump up an on-chip reference. Additionally, an amplifier is also required to ensure accurate regulation.

DETAILED DESCRIPTION

Figure 1:
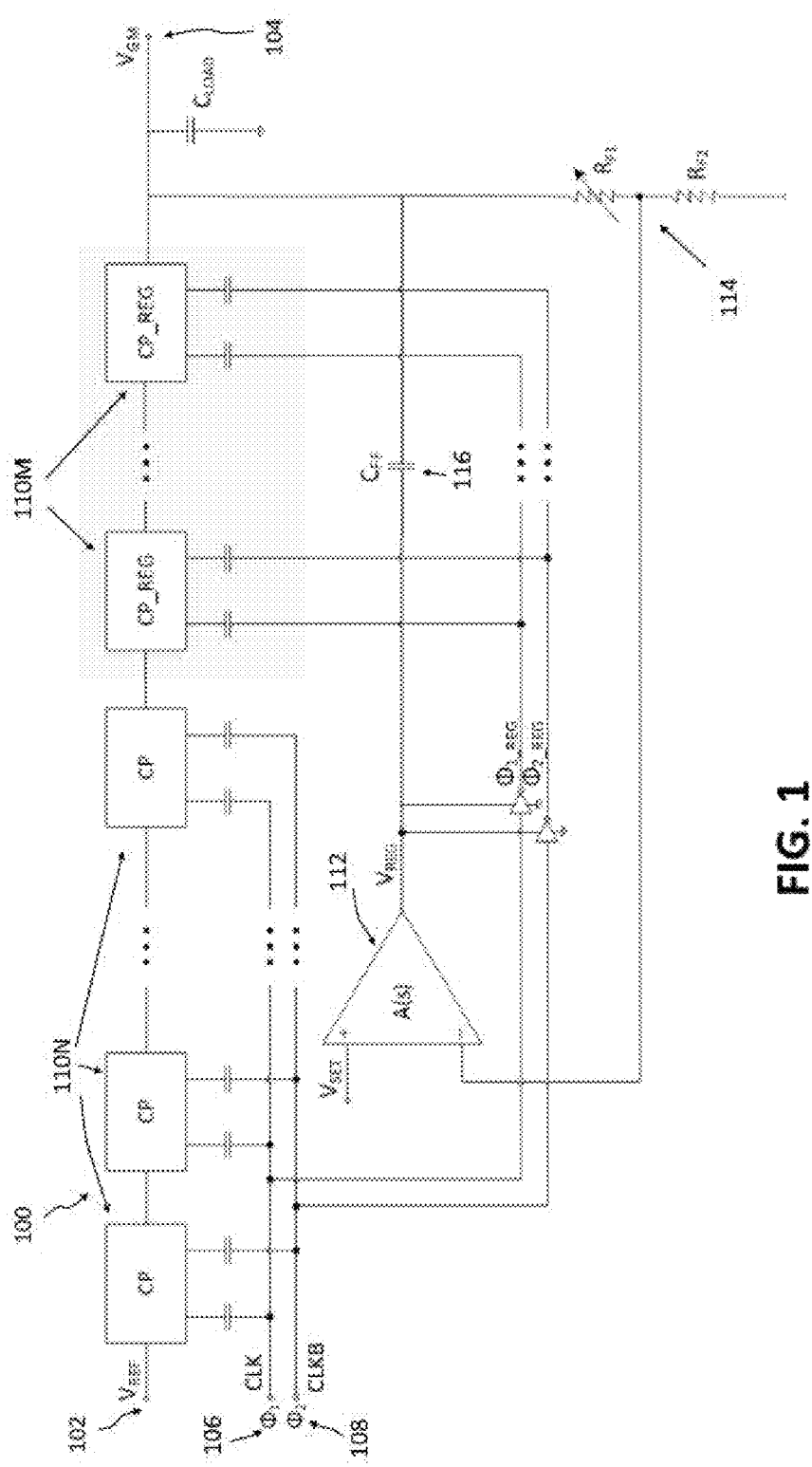
FIG. 1 is a schematic diagram of a variable charge-pump circuit in accordance with the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

The disclosure is directed to an accurate high voltage generation circuit with reduced current consumption over process variation. Current consumption is reduced by controlling the pumping voltage for a fixed number of the charge pump cells.

An embodiment of a variable high voltage charge pump system 100 according to the present disclosure is depicted in FIG. 1. The charge pump system 100 includes a plurality of MOS switching stages 110, also referred to as voltage doublers, arranged in a cascaded configuration between a voltage input node 102 and a voltage output node 104. The system 100 is configured to receive a clock signal (CLK) 106 and an inverse clock signal (CLKB) 108. The clock signals may be generated in any suitable manner. Each of MOS switching stage includes a clock signal input for receiving the clock signal (CLK), an inverse clock input for receiving the inverse clock signal (CLKB), and pumping capacitors.

Figure 2:
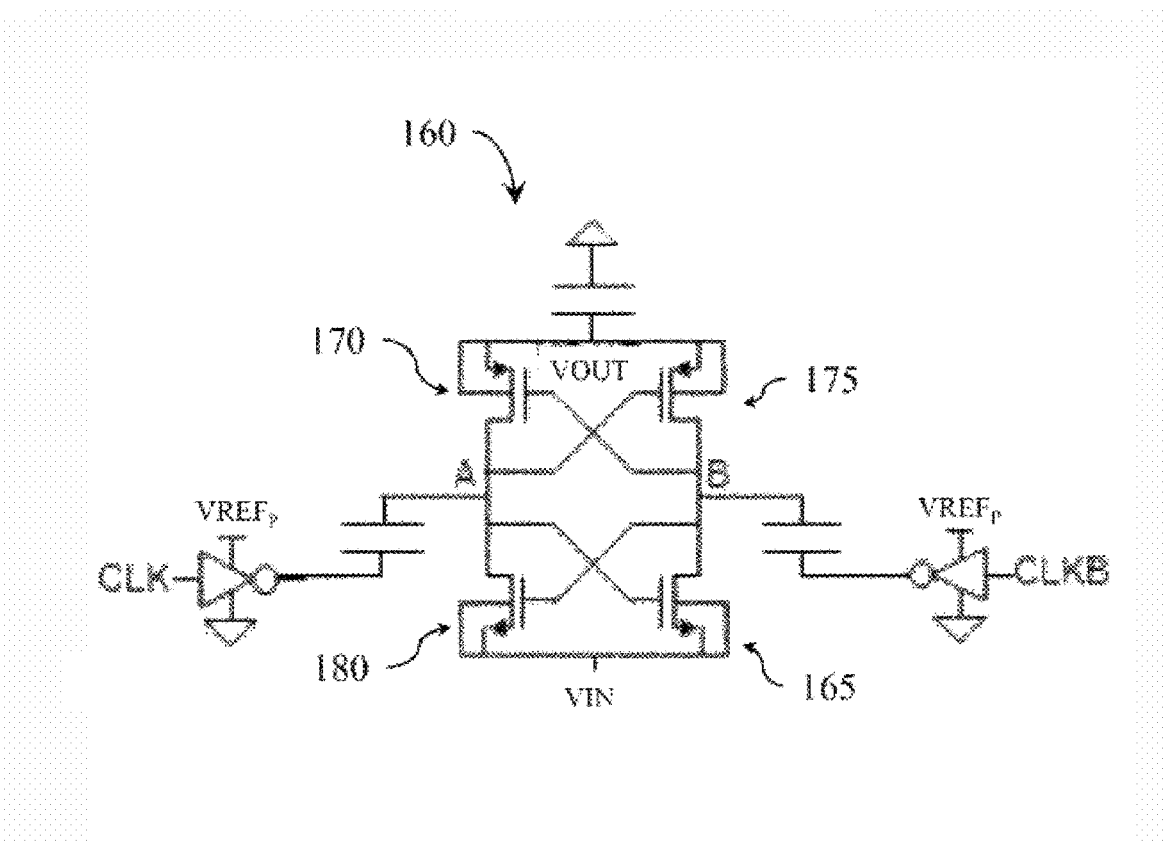
FIG. 2 is a schematic diagram of a MOS switching stage.

An embodiment of a MOS switching stage 110, also referred to as a voltage doubler, which may be used to implement the charge pump system is depicted in FIG. 2. The MOS switching stage includes, among other components, NMOS transistors 165 and 170, PMOS transistors 175 and 180, a node A, and a node B. A clock input signal (CLK) is received at node A, and an inverse clock input (CLKB) is received at node B. The clock signals may be generated in any suitable manner.

During operation, after a rising edge on CLK signal, transistors 165 and 170 are switched off while transistors 175 and 180 are switched on. Transistor 175 allows the capacitor on Node B to be charged to an input voltage (VIN) while transistor 165 isolates an output voltage (VOUT) from Node B. Conversely, transistor 170 isolates the stored charge on Node A from VIN and since charge is conserved when CLK transitions from low to high, the voltage on Node A is doubled with reference to ground and is transferred to VOUT through transistor 180. The same operation occurs on the rising edge of the CLKB signal with transistors 175 and 180 being switched off and transistors 170 and 165 switched on.

The change in voltage, when the clock signal transitions, has to be large enough to flip the latches formed by transistors 170/175 and transistors 165/180. This sets a lower limit on the value for VIN. Use of low threshold voltage transistors to lower the requirement on VIN is possible, but, because of leakage currents in the off state, the structure will not operate efficiently. With proper selection of components, which minimizes leakage currents in either the transistors or the capacitors, large cascaded voltage doublers can be used to generate large voltages, limited only by the leakage currents of the various components at the high voltages.

Referring again to FIG. 1, the charge pump system 100 includes a plurality of regulated switching stages 110M and a plurality of unregulated switching stages 110N. As used herein, the terms "regulated" and "unregulated" refers to the voltages of the clock input signal and inverse clock input signals which are supplied to the respective switching stages. A "regulated" voltage is controlled so as to be at a substantially constant, predetermined level regardless of fluctuations in the input voltage/current. An "unregulated" voltage is dependent almost solely on the input voltage. Any suitable number of unregulated and regulated switching stages may be used depending on various factors, such as the application and the desired voltage output.

The voltage output of an unregulated switching stage 110N may deviate from the desired or designed for voltage output. The regulated switching stages receive clock input signals and inverse clock input signals which are regulated to a predetermined regulated voltage level. Therefore, the output of the regulated switching stages should be substantially constant at the desired or designed for level. The regulated voltage level may be any suitable voltage depending on factors, such as the intended application and the components used.

Referring to FIG. 1, the regulated switching stages 110M receive a regulated input voltage $V_{reg}$ from an amplifier 112. The amplifier 112 is configured to adjust the clock input signals voltage to a fixed number of regulated switching stages 110M to bring the output voltage of the system to the desired value. This control scheme unloads the charge pump significantly, reducing the variation due to loading and reducing the overall current consumption of the system.

A voltage divider 114 is provided at the output stage of the charge pump system 100 to sense the output voltage and provide divided output voltage as a feedback signal to the amplifier. The voltage divider 114 includes resistors R1, R2. Any suitable resistance levels may be used for the voltage divider. To overcome the problem of poor device matching during fabrication, trimming mechanisms may be used to trim the process mismatches out of the final design. This may be performed by adjusting resistance levels in the feedback to the amplifier. The trim mechanism may be modified to give rise to further improvements (i.e., reduction) in total current variation. Preferably, any modifications in trim do not alter the load current of the system.

At least one feed-forward capacitor, also referred to as a bypass capacitor, may be used to improve stability and loop dynamics of the charge pump system. As can be seen in FIG. 1, a feed-forward capacitor $C_{ff}$ 116 is connected between the output of the amplifier 112 and the output of the charge pump system 100 (which is also the input to the voltage divider).

Once the amplifier is settled, the output voltage of an N+M stage charge pump is approximated by Eq. 1.

$$V_{GM} = (N+1)V_{DDG} + MV_{REG} - (N+M)I_{Load}/fC \quad (1)$$

where N is the number of unregulated switching stages and M is the number of regulated switching stages.

The approximate current consumption of the system consists of the ideal and the parasitic losses, such as parasitic capacitance and diode losses, reversion losses, etc. From Eq. 2, any variation in the load current ($I_{load}$) is amplified by the total number of stages. With this new architecture, variations in the load current only come from process variations on the resistor, variations on the voltage reference to the amplifier ($V_{set}$), and any trim added to the resistor.

$$I_{TOTAL} = (N+M+1)I_{LOAD} + I_{PAR} \quad (2)$$

As currents are reduced, the output impedance of the system and the corresponding bandwidth of the also reduces. Any disturbances fed back onto the source can take a significant time to dissipate. In this invention, the bandwidth is extended at high frequencies using a bypass capacitor ($C_{FF}$ in FIG. 1) around the regulated section of the charge pump. This allows the loop to respond and suppress the disturbance quickly.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A variable high voltage charge-pump system comprising:
    an output node at which an output voltage is provided;
    a plurality of unregulated switching stages coupled to the output node, each of the unregulated switching stages including an unregulated clock input, an unregulated inverse clock input, and pumping capacitors, the unregulated clock input receiving an unregulated clock signal, the unregulated inverse clock input receiving an unregulated inverse clock signal;
    a plurality of regulated switching stages coupled to the output node, each of the regulated switching stages including a regulated clock input, an regulated inverse clock input, and pumping capacitors, the regulated clock input receiving a regulated clock signal, the regulated inverse clock input receiving a regulated inverse clock signal; and
    an amplifier that outputs a regulating voltage, the regulated clock signal and the regulated inverse clock signal being generated based on the regulating voltage,
    wherein the regulating voltage is adjustable to bring the output voltage to a desired value.

2. The system of claim 1, wherein the plurality of unregulated switching stages and the plurality of regulated switching stages are arranged in a cascaded configuration.

3. The system of claim 1, wherein a feedback loop for the amplifier is connected to the output node.

4. The system of claim 3, wherein the amplifier has a first input and a second input,
    wherein the feedback loop is connected to the first input,
    wherein a setpoint voltage is connected to the second input, and
    wherein the regulating voltage is provided at an output of the amplifier.

5. The system of claim 4, wherein the setpoint voltage is modified to adjust the regulating voltage.

6. The system of claim 4, wherein the feedback loop includes a voltage divider.

7. The system of claim 6, wherein a resistance value of the voltage divider is selected to adjust the output voltage without adjusting a load current at the output node.

8. The system of claim 4, wherein at least one feed-forward capacitor electrically connects the output of the amplifier to the output node, bypassing the regulated switching stages.

9. The system of claim 1, wherein the unregulated switching stages are implemented using voltage doublers.

10. A method of operating a variable high voltage charge pump system, comprising:
    supplying an unregulated clock voltage and an unregulated inverse clock voltage to a plurality of unregulated switching stages, the plurality of unregulated switching stages being cascaded with a plurality of regulated switching stages, the plurality of unregulated switching stages and the plurality of regulated switching stages being coupled to provide an output voltage at an output node, each of the unregulated switching stages including an unregulated clock input, an unregulated inverse clock input and pumping capacitors, the unregulated clock input voltage being supplied to the clock input and the unregulated inverse clock input voltage being supplied to the inverse clock input;
    supplying a regulated clock voltage and a regulated inverse clock voltage to the plurality of regulated switching stages, each of the regulated switching stages including a regulated clock input, a regulated inverse clock input and pumping capacitors, the regulated clock input voltage being supplied to the regulated clock input and the regulated inverse clock input voltage being supplied to the regulated inverse clock input;
    adjusting the regulated clock voltage and the regulated inverse clock voltage to bring the output voltage to a desired value.

11. The method of claim 10, wherein adjusting the regulated clock voltage further comprises:
    generating a reference regulating voltage using a feedback loop connected to the output node and with reference to a setpoint voltage; and
    adjusting the regulated clock voltage and the regulated inverse clock voltage based on the reference regulating voltage.

12. The method of claim 11, wherein the feedback loop is connected to a first input of an amplifier and the setpoint voltage is connected to a second input of the amplifier, the reference regulating voltage being provided at an output of the amplifier.

13. The method of claim 12, wherein the output of the amplifier is connected to the output node via at least one feed-forward capacitor.

14. The method of claim 12, wherein the feedback loop includes a voltage divider.

15. The method of claim 10, wherein a trimming scheme is implemented to adjust the output voltage without adjusting a load current.

16. The method of claim 15, wherein the trimming scheme includes adjusting a resistance value of the feedback loop.

* * * * *